United States Patent
Mantri et al.

(10) Patent No.: US 9,864,854 B2
(45) Date of Patent: Jan. 9, 2018

(54) USER AUTHENTICATION BASED ON PHYSICAL MOVEMENT INFORMATION

(71) Applicant: Verizon Patent and Licensing Inc., Arlington, VA (US)

(72) Inventors: Viraj C. Mantri, Hyderabad (IN); Prateek Mehrotra, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 52 days.

(21) Appl. No.: 14/876,665

(22) Filed: Oct. 6, 2015

(65) Prior Publication Data
US 2017/0098068 A1  Apr. 6, 2017

(51) Int. Cl.
| | |
|---|---|
| *H04L 29/06* | (2006.01) |
| *G06F 21/36* | (2013.01) |
| *G06F 3/01* | (2006.01) |
| *G06F 3/0346* | (2013.01) |

(52) U.S. Cl.
CPC .............. *G06F 21/36* (2013.01); *G06F 3/017* (2013.01); *G06F 3/0346* (2013.01)

(58) Field of Classification Search
CPC ....................................................... G06F 21/36
See application file for complete search history.

(56) References Cited

U.S. PATENT DOCUMENTS

| | | | | |
|---|---|---|---|---|
| 8,750,799 B2 * | 6/2014 | Giles | ..................... | H04W 4/206 455/41.2 |
| 9,256,722 B2 * | 2/2016 | Saxman | .................. | G06F 21/33 |
| 2002/0183112 A1 * | 12/2002 | Emmerson | ............ | A63F 13/005 463/41 |
| 2010/0184408 A1 * | 7/2010 | Vendrow | ........... | H04M 3/42153 455/411 |
| 2011/0023110 A1 * | 1/2011 | Freund | .................... | G06F 21/36 726/16 |

(Continued)

FOREIGN PATENT DOCUMENTS

| | | | | |
|---|---|---|---|---|
| CN | 102752710 A | * | 10/2012 | |
| DE | EP 2458524 A1 | * | 5/2012 | ........... G02F 21/316 |

OTHER PUBLICATIONS

Guerar, Meriem, et al. "A completely automatic public physical test to tell computers and humans apart: a way to enhance authentication schemes in mobile devices." High Performance Computing & Simulation (HPCS), 2015 International Conference on. IEEE, 2015.*

*Primary Examiner* — Shawnchoy Rahman (57) ABSTRACT

Techniques described herein may be used to implement a Completely Automated Public Turing test to tell Computers and Humans Apart (CAPTCHA) test that requires a user of a user device (e.g., a smartphone, a laptop computer, etc.) to physically move in a certain pattern. In one implementation, a user device may prompt the user to physically move the user device according to a specified pattern. As the user does so, sensors of the user device may detect the movements of the user, and cause the user to be authenticated based on the physical movements. In another implementation, a user device may request that the user make a physical gesture in front of the user device. In so doing, an infrared sensor of the user device may detect the user's movements, and the user device may cause the user to be authenticated based on the physical movements.

20 Claims, 11 Drawing Sheets

(56) References Cited

U.S. PATENT DOCUMENTS

| | | | |
|---|---|---|---|
| 2014/0246917 A1* | 9/2014 | Proud | H02J 17/00 307/104 |
| 2014/0257047 A1* | 9/2014 | Sillay | A61B 5/11 600/301 |
| 2014/0278229 A1* | 9/2014 | Hong | A63B 71/06 702/160 |
| 2016/0019547 A1* | 1/2016 | Gurnani | G06Q 20/40145 705/44 |

* cited by examiner

USER AUTHENTICATION BASED ON PHYSICAL MOVEMENT INFORMATION

BACKGROUND

User devices (e.g., smartphones, laptop computers, etc.) are often capable of accessing various online services (e.g., email, social networking, banking, shopping, etc.). In order to access such services, a user must often register for the service (e.g., create an account) and provide authentication information (e.g., a username and password) each time the service is accessed. In some scenarios, a user must demonstrate that he or she is an actual person (instead of, for example, a computer) by passing a challenge-response test, such as a Completely Automated Public Turing test to tell Computers and Humans Apart (CAPTCHA) test. A common example of a CAPTCHA test includes showing a user an image that includes a sequence of numbers and requiring the user to enter the sequence of numbers into a textbox. The image may have a skewed perspective, poor lighting, and/or other visual effects to make it difficult for a software program to interpret the numbers in the image accurately.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Techniques described herein may be used to authenticate a user based on physical movements of the user. In some implementations, the techniques described herein may be applied to a Completely Automated Public Turing test to tell Computers and Humans Apart (CAPTCHA) test. For example, the user device may prompt the user to verify that he or she is actually a human by physically moving the user device (e.g., a smartphone, tablet computer, etc.) according to a particular patter, such as in the shape of the letter "S". As the user does so, sensors built into the user device (e.g., an accelerometer and a gyroscope) may detect the movements of the user device, and generate information indicating that the user device has actually moved in accordance with the required pattern. The user device may communicate the information to an authentication server that may use the information to verify that the user is actually a human.

In another example, the user device may request that the user make a physical gesture in front of the user device. In so doing, a camera, an infrared sensor, or another type of sensor may detect the user's movements and generate information indicating that the user has moved in accordance with the required pattern. As in the previous example, the user device may communicate the information to an authentication server that may use the information to verify that the user is actually a human. Additionally, while physical movements may be used verify that a user is actually a human (e.g., via a CAPTCHA test) physical movements may also be as identification and authentication information. For example, in some implementations, physical movements may be used instead of a username and/or password, to authenticate a user for a particular service (e.g., an email service, a social networking service, etc.). As such, reference herein to authenticating a user may refer to verifying that the user is actually a human and/or authenticating a user for access to a device or service.

Figure 1A:
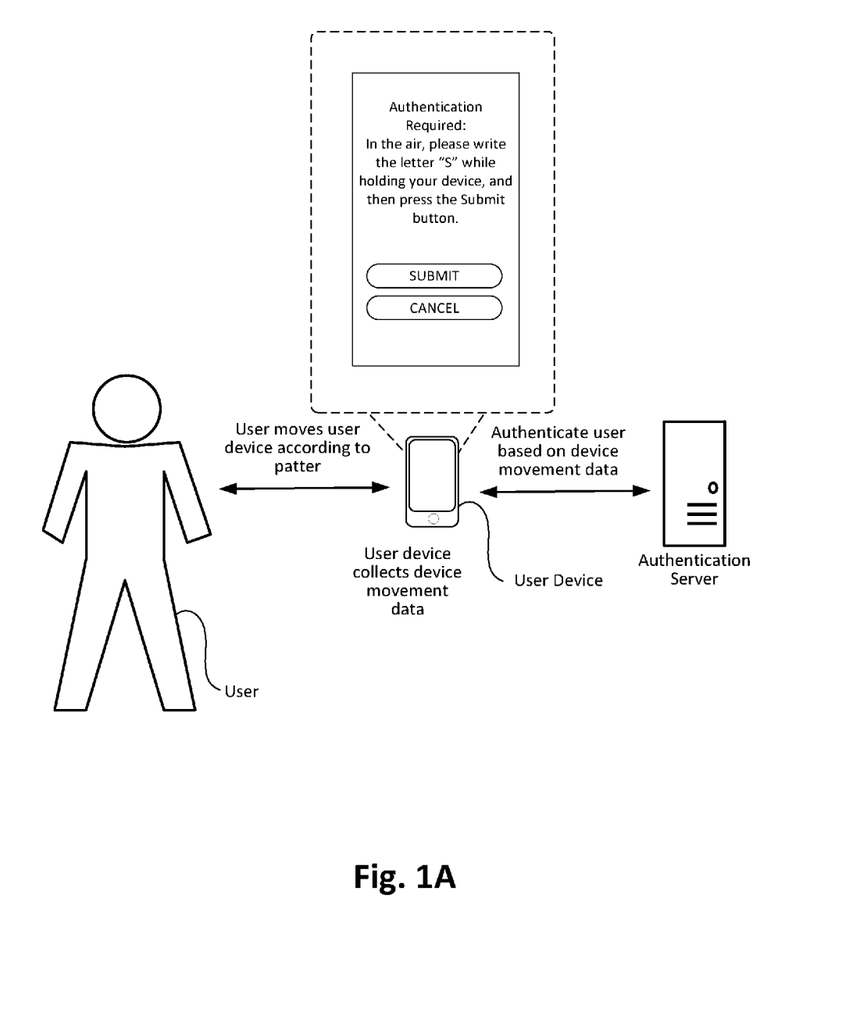
FIGS. 1A and 1B are diagrams illustrating an example overview of an implementation described herein.

FIGS. 1A and 1B are diagrams illustrating an example overview of an implementation described herein. As shown in FIG. 1A, a user device may prompt a user with an authentication request. The authentication request may be in response to the user attempting to access the user device, a mobile application, or a service via the user device (e.g., an email service, a social networking service, etc.). The authentication request may instruct the user to physically move the user device according to a particular pattern. In the example of FIG. 1A, the user is instructed to make a gesture of the letter "S" while holding the user device, and then to select the submit button. As the user does as instructed, movement sensors of the user device (e.g., an accelerometer, a gyroscope, etc.) may generate information representing the movements of the user device, and the user device may provide the information to an authentication server. The information may be used by the authentication server to authenticate the user as an actual person (as opposed to a computer) and/or as an authorized user.

Figure 1B:
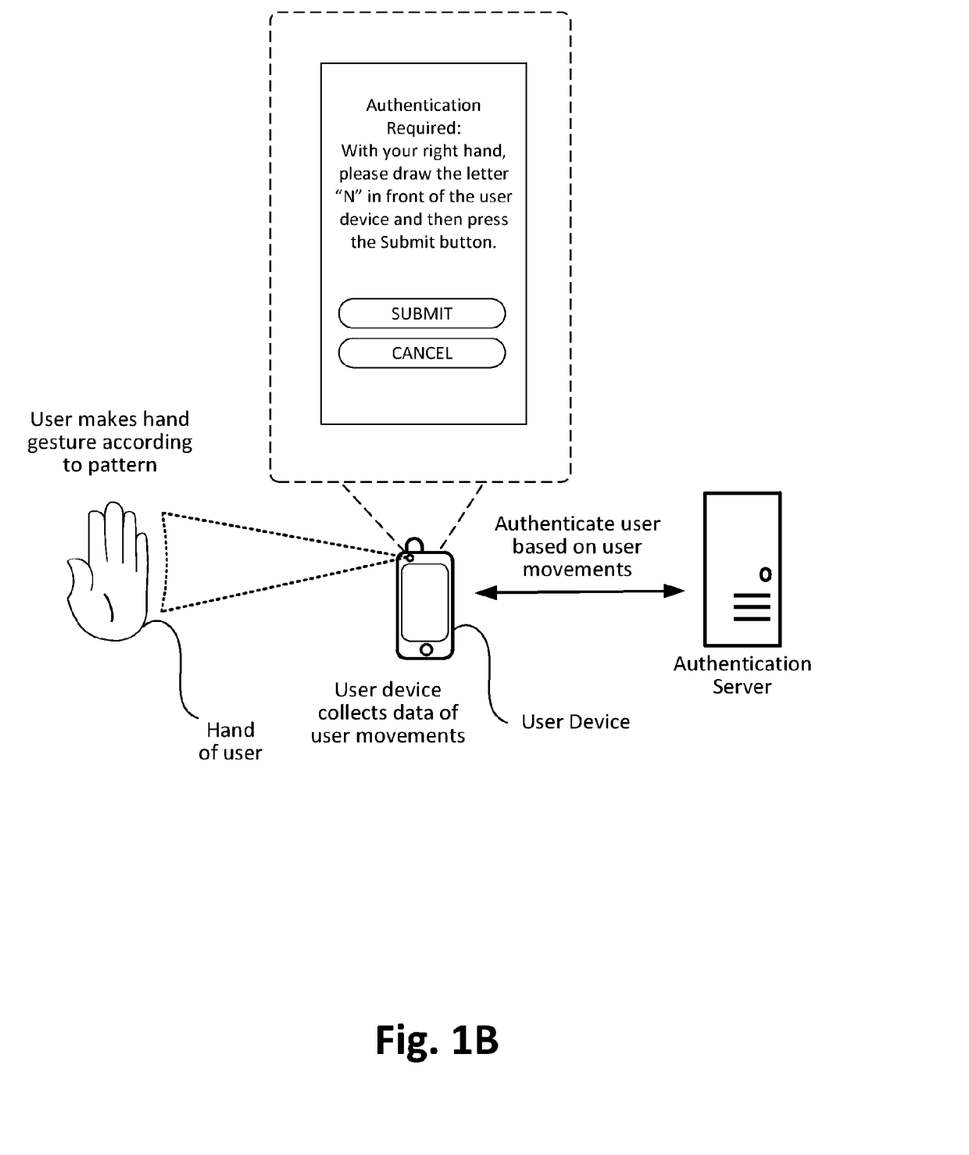

As shown in FIG. 1B, the user device may also prompt the user with an authentication request. The authentication request may be in response to the user attempting to access the user device, a mobile application, or a service via the user device. The authentication request may instruct the user to physically move his or her hand in a particular pattern in front of the user device. In the example of FIG. 1B, the user is instructed to draw the letter "N" in front of the user device, and then to select the Submit button. As the user does so, proximity sensors, such as a camera, an infrared sensor, etc., may detect the movements of the user, and may produce information representing the movements detected. The information may be collected by the user device and provided to an authentication server. The information may be used by the authentication server to authenticate the user as an actual person (as opposed to a computer) and/or as an authorized user. As such, techniques described herein may enable a user to be authenticated based on the way the user moves the user device and/or the way the user moves in front of, or near, the user device.

Figure 2:
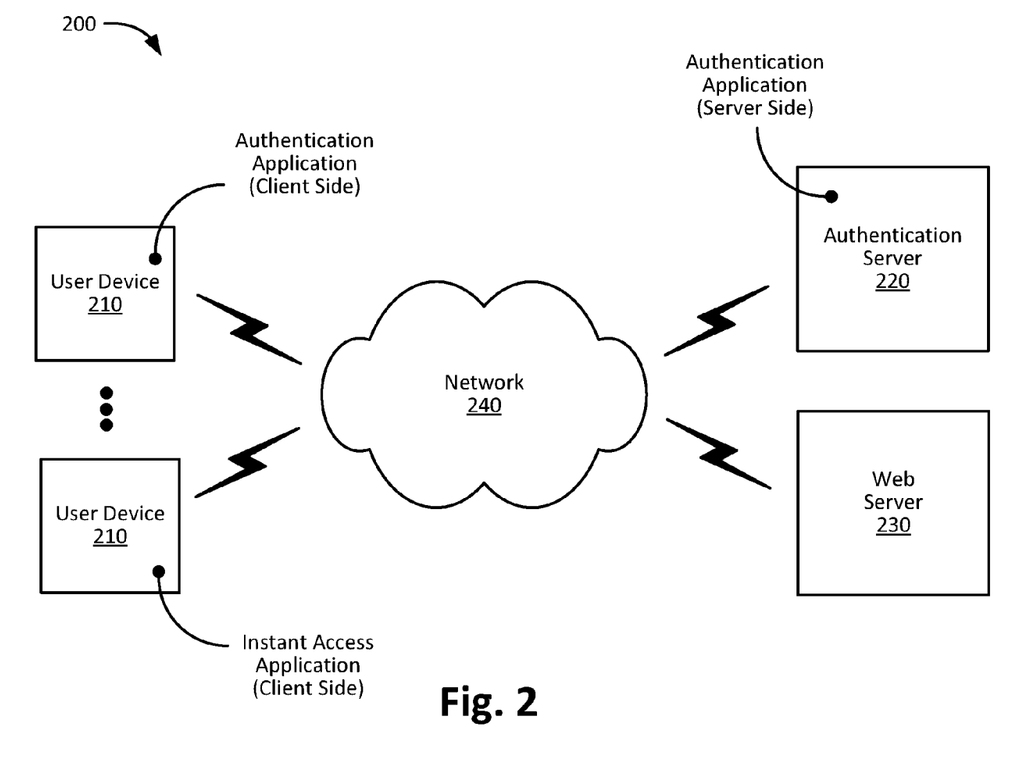
FIG. 2 is a diagram of an example environment in which systems and/or methods described herein may be implemented.

FIG. 2 is a diagram of an example environment 200 in which systems and/or methods described herein may be implemented. Environment 200 may include one or more user devices 210, authentication server 220, web server 230, and network 240.

User device 210 may include a portable computing and communication device, such as a personal digital assistant (PDA), a smart phone, a cellular phone, a laptop computer with connectivity to a cellular wireless network, a tablet computer, etc. User device 210 may also include non-portable computing devices, such as a desktop computer, a consumer or business appliance, or other devices that have the ability to connect to network 240. User device 210 may also include a computing and communication device that may be worn by a user (also referred to as wearable devices) as a watch, a fitness band, a neckless, glasses, an eyeglass, a ring, a belt, a headset, or another type of wearable device. As depicted, user device 210 may include software, such as an authentication application, that may enable a user of user device 210 to be authenticated by moving user device 210 in a particular manner and/or by gesturing in a particular manner in front of sensors of user device 210.

In some implementations, user device 210 may include one or more sensors for detecting movements of user device 210 and/or movements of the user near user device 210. For instance, user device 210 may include an accelerometer, a gyroscope, a camera, an infrared sensors, etc. In some implementations, the accelerometer and the gyroscope may produce information corresponding to movements of user device 210. In some implementations, the camera and the infrared sensor may produce information corresponding to movements of the user. For instance, the accelerometer may detect changes in acceleration experienced by user device 210, and the gyroscope may detect rotational movements experienced by user device 210; while the camera may capture imaging information of a user's gestures, and the infrared sensor may detect heat (e.g., a human body) near user device 210. In some implementations, user device 210 may process the information captured by the sensors to represent distances, velocities, durations, and other information that may be used by authentication server 220 to authenticate the user. In some implementations, user device 210 may relay the raw information produced from the sensors without processing the information.

Authentication server 220 may include one or more computing devices, such as a server device or a collection of server devices, capable of authenticating the user of user device 210. As depicted, authentication server 220 may include software, such as an authentication application, that may enable a user of user device 210 to be authenticated by moving user device 210 in a particular manner and/or by gesturing in a particular manner in front sensors of user device 210. In some implementations, authentication server 220 may include a CAPTCHA server capable of verifying that the user of user device 210 is, in fact, human. In some implementations, authentication server 220 may also, or alternatively, authenticate the user of user device 210 as a particular user (e.g., a particular user that corresponds to user information, settings, services, etc.).

Web server 220 may include one or more computing devices, such as a server device or a collection of server devices, capable of providing a service to user device 210. Examples of such service may include an email service, a data storage service, a social networking service, a search engine service, a scheduling service, a telephone conferencing service, etc. In some implementations, web server 230 may require that users be authenticated by authentication server 220 prior to registering for, or accessing, the service provided by web server 230. For instance, if web server 230 is an email server, web server 230 may require users to be authenticated by authentication server 220 prior to registering for (and/or accessing) the email service. Once the user has been authenticated, authentication server 220 may notify web server 230 so that the user may access the email service. Additionally, while authentication server 220 is depicted in FIG. 2 as being a separate device than web server 230, in some implementations, authentication server 220 and web server 230 may be incorporated into the same server device.

Network 240 may include one or more wired and/or wireless networks. For example, network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 240 may include a local area network (LAN), a wireless LAN (WLAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

Figure 3:
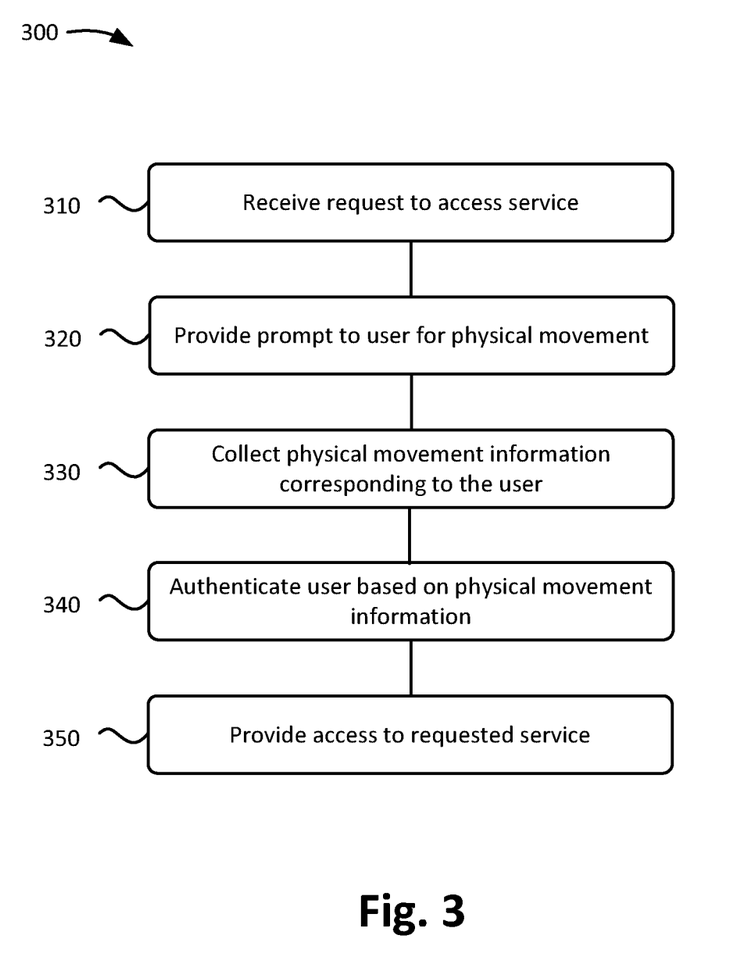
FIG. 3 is a diagram of an example process 300 for authenticating a user based on movement information.

FIG. 3 is a diagram of an example process 300 for authenticating a user based on movement information. Process 300 may be performed by user device 210, authentication server 220, or a combination of user device 210 and authentication server 220.

As shown, process 300 may include receiving a request to access a service (block 310). For example, user device 210 may receive a request from a user to access a particular service (e.g., an email service, a social networking service, etc.). In some implementations, the user may request the service but be required to first register for the service (e.g., create an account, a user profile, etc.). In some implementations, the user may have already been registered for the service, and the request may be to access the service. In some implementations, the request to access a service may be a request to gain access to user device 210.

Process 300 may include providing a prompt to the user for physical movement (block 320). For instance, user device 210 may prompt the user to move in accordance with an authentication pattern that may be displayed to the user. Examples of an authentication pattern may include a number, a letter, or a symbol. In some implementations, the user may be prompted to move user device 210 in accordance with the authentication pattern. In some implementations, the user may be prompted to move him or herself, near a camera or infrared sensor of user device 210, in accordance with the authentication pattern. In some implementations, the pattern provided to the user may have been received by user device 210 from authentication server 220.

For instance, authentication server 220 may include, or have access to, a repository of authentication patterns that may be used to verify that a user is actually human. Authentication server 220 may provide a copy one of the authentication patterns to user device 210 so that the user may be prompted to recreate a pattern that is known to authentication server 220. As such, authentication server 220 may authenticate the user by comparing the movements of the user (or user device) with the authentication pattern stored by authentication server 220. In some implementations, user device 210 may also prompt the user for a username and password. For instance, the user may be identified based on a username and password provided by the user, and the user may be authenticated (e.g., as an actual human) based on the physical movements that the user is prompted to carryout. FIGS. 6-13 provide specific examples and descriptions of prompts for information and physical movement.

Figure 4:
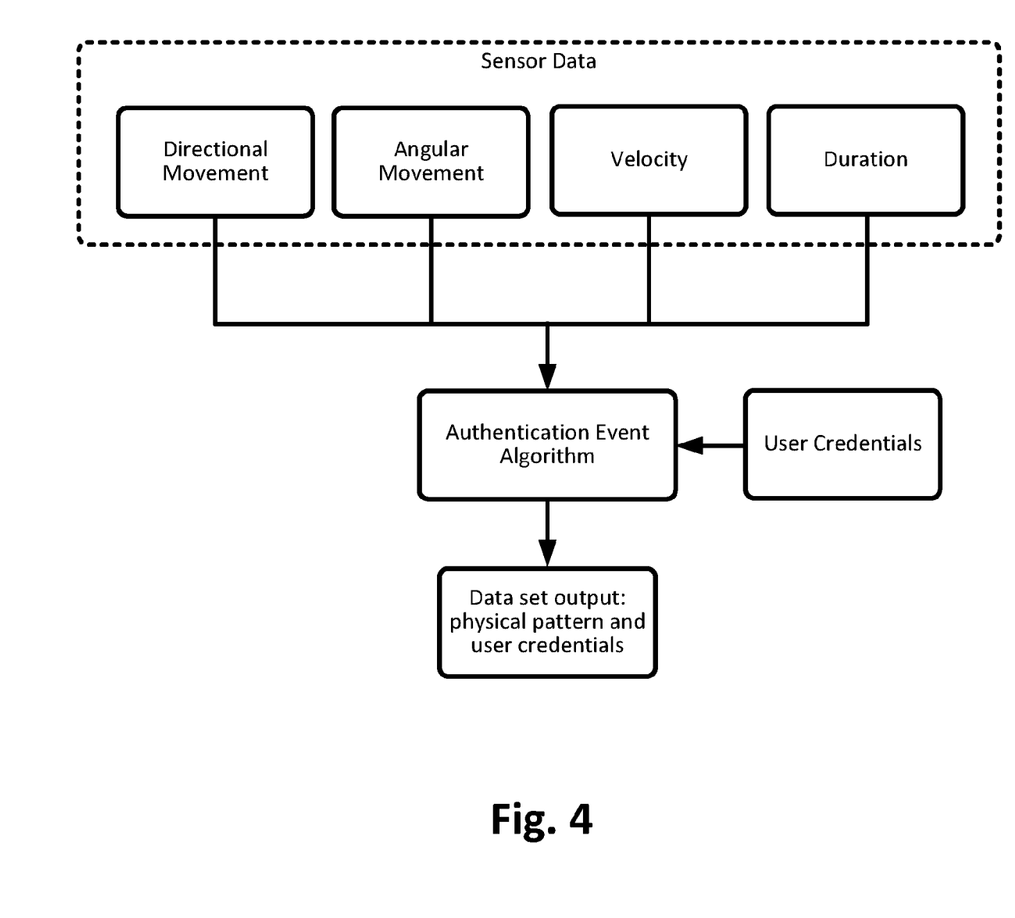
FIG. 4 is a logical flow diagram of an example implementation for producing a data set for authenticating a user.

Process 300 may include collecting movement information corresponding to the user (block 330). For instance, user device 210 may prompt the user to make certain movements (with or without user device 210) and collect information corresponding to the movements. The information may be generated by one or more sensors of user device 210. For instance, if the user was prompted to move user device 210 in a particular manner, user device 210 may collect information from an accelerometer and/or gyroscope of user device 210. If the user was prompted to move him or herself in a particular way, user device may collect information from a camera and/or infrared sensor of user device 210. In some implementations, user device 210 may process the information generated by the sensors in order to produce a data set representing the movements according to a preselected format (e.g., vectors, accelerations, angular movements, velocities, distances, durations, patterns, etc.). FIG. 4 provides additional examples and descriptions of the types of movement information that may be collected and processed by user device 210.

Process 300 may include authenticating the user based on the movement information (block 340). For instance, user device 210 may authenticate the user based on the movement information generated by the sensors of user device 210. In some implementations, user device 210 may authenticate the user by providing the movement information to authentication server 220. In some implementations, user device 210 may authenticate the user locally (e.g., by comparing the movement information to a preselected data set of acceptable movement information).

In some implementations, user device 210 and/or authentication server 220 may evaluate the movement information by balancing accuracy with human nature. For instance, if the user was prompted to move user device 210 in a pattern consistent with the letter "S," the movement information produced as a result of the user doing so is unlikely to describe a perfect S. As such, authenticating the user may include determining whether the movement information is sufficiently accurate to correspond to a pattern of the letter "S" but also sufficiently inaccurate as to indicate that movement information was likely the result of human conduct.

Process 300 may include providing access to the requested server (block 350). For instance, user device 210 and/or authentication server 220 may provide the user with access to the service requested by the user. For instance, if the user requested access to an email service, the user may be provided access to the email service after the user has been authenticated. As mentioned above, authenticating the user may include requiring that the user provide a username and password along with engaging in a particular physical movement. For instance, the username and password may serve to authenticate the user as a registered user, and the movement information may be used to ensure that the username and password was provided by a human.

In some implementations, the movement information may be used to authenticate the user, such that a username and password is not required. For instance, user device 210 may simply prompt the user for a security gesture, which is known only to the user. The gesture may be associated with a username and a password, such that by providing the gesture the user effectively provides the username and password as well. In addition, based on an analysis of the movement information corresponding to the gesture, user device 210 or authentication server 220 may verify that the gesture is sufficiently accurate to authenticate the user but not so accurate as to be from a seemingly inhuman source (e.g., a computer).

FIG. 4 is a logical flow diagram of an example implementation for producing a data set for authenticating a user. In some implementations, the information and operations represented by the logical flow diagram of FIG. 4 may be implemented by user device 210. In some implementations, the information and operations represented by the logical flow diagram of FIG. 4 may be implemented by a combination of user device 210 and authentication server 220.

An authentication event algorithm operating on user device 210 may collect one or more types of information to produce a data set for authenticating a user. The source of the information may be a combination of the user and built-in sensors of user device 210 (e.g., an accelerometer, a gyroscope, an internal compass, a camera, an infrared sensor, etc.). For instance, to gain access to a particular service, the user may be required to provide an accurate username and password and then demonstrate that the user is, in fact, human. In such a scenario, the user may input user credentials (such as a username and password) that were previously registered with the service being requested. In order to demonstrate that the user is human, the user may provide user device 210 movement information by moving user device 210 in accordance with an authentication pattern.

In response to the physical movement, the sensors of user device 210 may generate information representing directional movement, angular movement, acceleration and velocity, duration, and more. For instance, an internal compass, an internal clock, and an accelerometer may provide information regarding directional movements and velocities of user device 210. As another example, an internal clock and a gyroscope may provide information regarding angular movements and angular velocities of user device 210. Authentication event algorithm may use such information to produce information representing a pattern traveled by user device 210 as a result of the physical movements of the user.

In another example, the user may demonstrate that he or she is human by moving or gesturing, in accordance with an authentication pattern, near built-in sensors of user device 210. In response to the movements, user device 210 may generate information representing directional movements, angular movements, velocities, durations, and more. For instance, an infrared sensor and an internal clock may provide information regarding directional movements, angular movements, and velocities of gestures made by the user. In some implementations, the infrared sensor may do so by comparing changes in heat patterns relative to a reference background. The authentication event algorithm may use such information to produce information describing a pattern created by the physical movements of the user.

As shown, the authentication event algorithm may use the information representing the pattern (whether created by the movements of the user or user device 210) and the user credentials to create a data set that can be used to authenticate the user. User device 210 may communicate the data set to authentication server 220, and authentication server 220 may identify the user based on the user credentials (e.g., a username and password) and verify that the user is actually human based on the physical pattern information. For instance, authentication server 220 may include, or have access to, usernames and passwords for users that are authorized to use a particular service. Additionally, authentication server 220 may include physical pattern information that may be compared to the physical pattern information from user device 210 in order to verify that the user is human.

Figure 5:
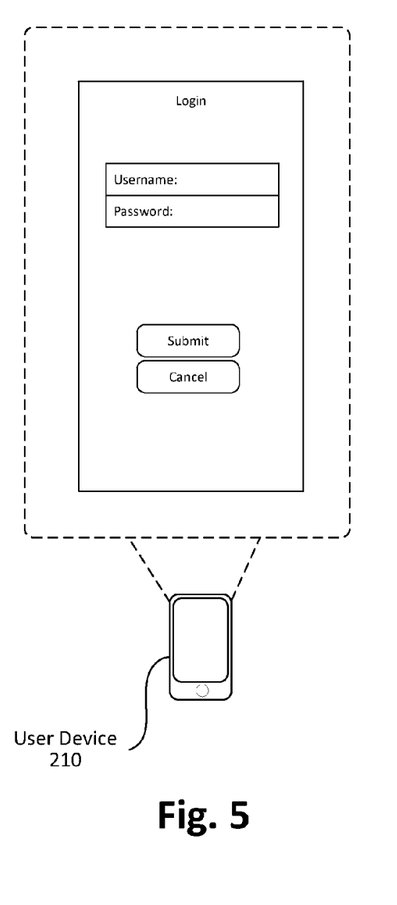
FIGS. 5-10 are diagrams of example user interfaces for authenticating a user based on movement information of a user device.

FIGS. 5-10 are diagrams of example user interfaces for authenticating a user based on movement information of user device 210. Assume that the user interfaces of FIGS. 5-10 are part of an authentication process that a user must complete in order to gain access to a particular service (e.g., an online banking service, an email service, etc.). As shown in FIG. 5, user device 210 may include a login screen where a user may input user credentials (e.g., a username and password) in order to access the service.

Figure 6:
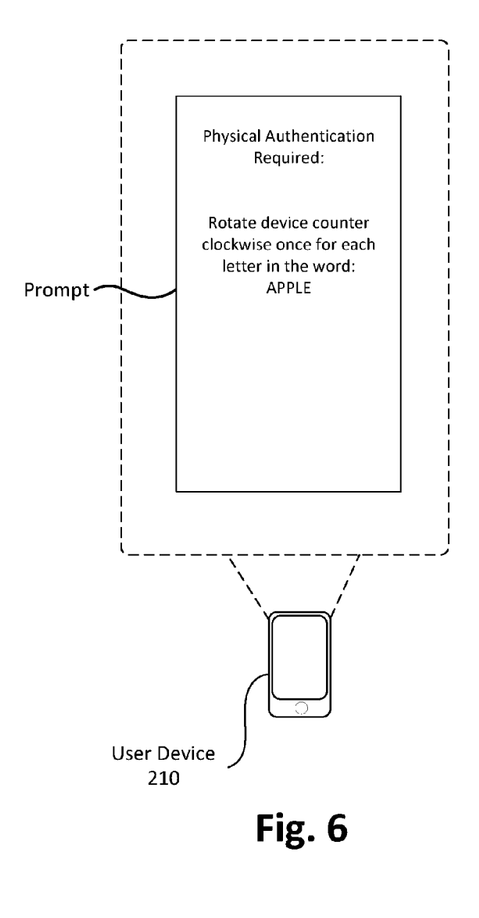

In FIG. 6, user device 210 may prompt the user to move user device 210 according to an authentication pattern in order to verify that the user is actually human. The prompt may be presented as a puzzle or a riddle in order to further verify that the user is human. For instance, as shown in FIG. 6, user device 210 may prompt the user to rotate user device in a certain direction and for a certain number of times; however, instead of stating the number of times outright, the prompt may require the user to deduce the number rotations that are required based on a puzzle or riddle (e.g., once for each letter in the word "apple"). As such, in addition to verifying that the user is human based on moving user device 210 in accordance with an authentication pattern, user device 210 may further verify that the user is human by presenting instructions in a puzzle or riddle.

Figure 7:
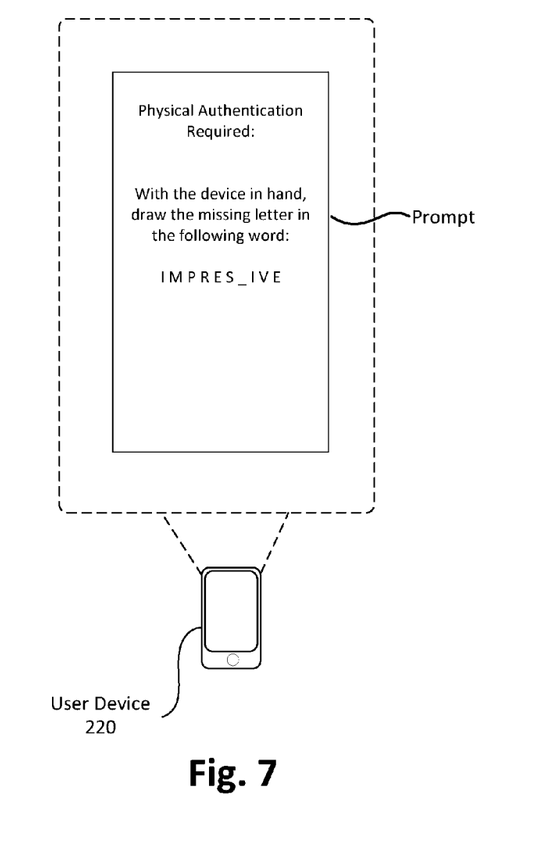
Figure 8:
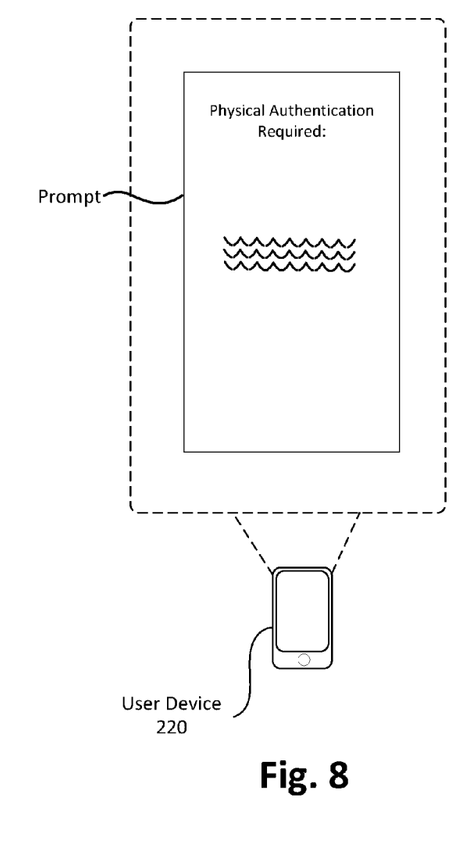

FIG. 7 is another example of a prompt that may be presented to a user. As shown, the instructions may be presented as part of a word puzzle. For instance, the prompt may require the user to deduce the required pattern by determining the missing letter in a word. In some implementations, the word may be obfuscated using traditional CAPTCHA techniques (e.g., the word may be displayed as part of a blurred image). In FIG. 8, the prompt does not provide any words or explicit instructions. Instead, user device 210 merely displays an image, and the user must deduce that the image represents an authentication pattern that the user must replicate in order to access the requested service. As such, the required pattern may be explicitly or implicitly communicated to the user. Thus, in the example, of FIG. 8, in which a "wavy" line is shown, the user may be required to move user device 220 in a "way line" pattern.

Figure 9:
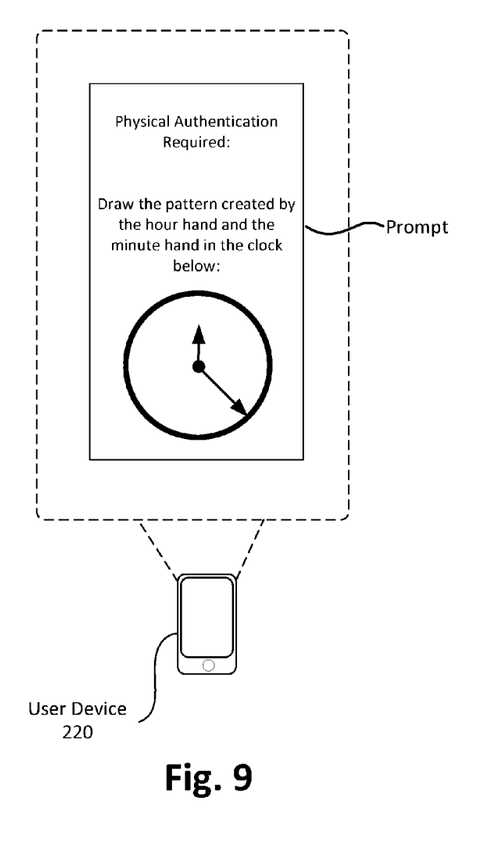
Figure 10:
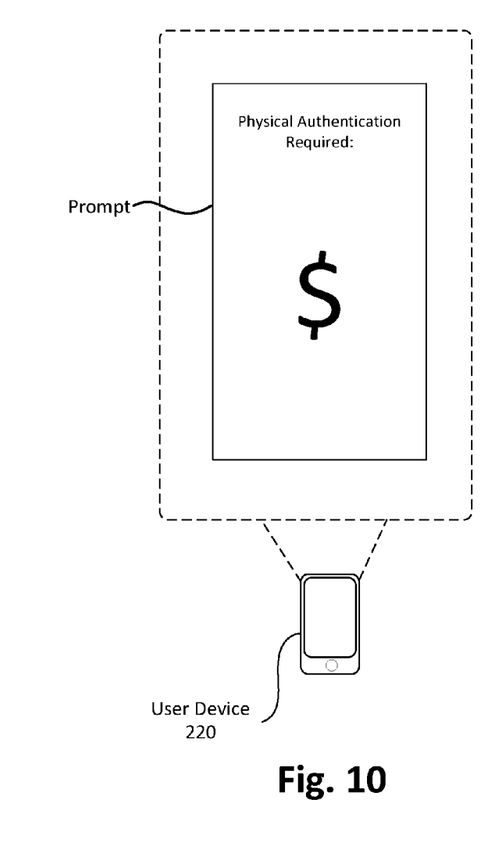

Referring now to FIG. 9, user device 210 may communicate the required pattern to the user by another object. For instance, in FIG. 9, the user may be instructed to move user device 210 in a patter created by the hour hand and the minute hand of a clock displayed by user device 210. As shown in FIG. 10, user device 210 may communicate the authentication pattern to the user by displaying a symbol that the user is presumably familiar with (such as a symbol representing money). In this example, the user may not be capable of moving the user device in one seamless motion in order to replicate the required pattern. As such, the user may be required to introduce ancillary movements in order to best follow the required pattern. Authentication server 220 may be aware of such scenarios and compare the user's movements with the authentication pattern, taking into account that the user was required to incorporate ancillary movements in order to complete the pattern. Such authentication patterns may further may provide additional security as it may be difficult for a software program to produce movement information that follows a particular pattern but that also introduces human-like ancillary movements in order to complete the pattern.

Figure 11:
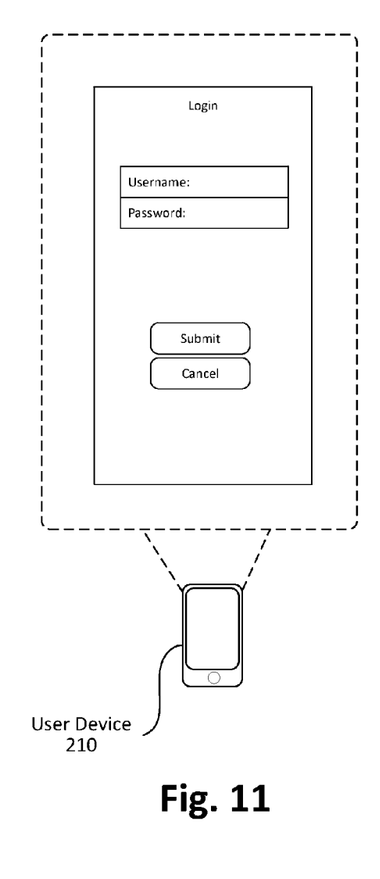
FIGS. 11-12 are diagrams of example user interfaces for authenticating a user based on movement information of a user.
Figure 12:
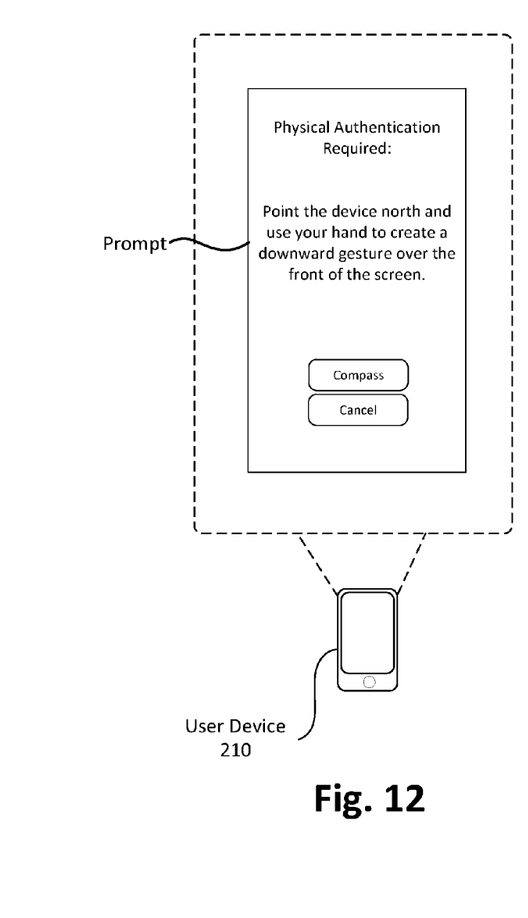

FIGS. 11-12 are diagrams of example user interfaces for authenticating a user based on movement information of a user. Assume that the user interfaces of FIGS. 11-12 are part of an authentication process that a user must complete in order to gain access to a particular service (e.g., an online banking service, an email service, etc.). As shown in FIG. 11, user device 210 may include a login screen where a user may input user credentials (e.g., a username and password) in order to access the service.

Figure 13:
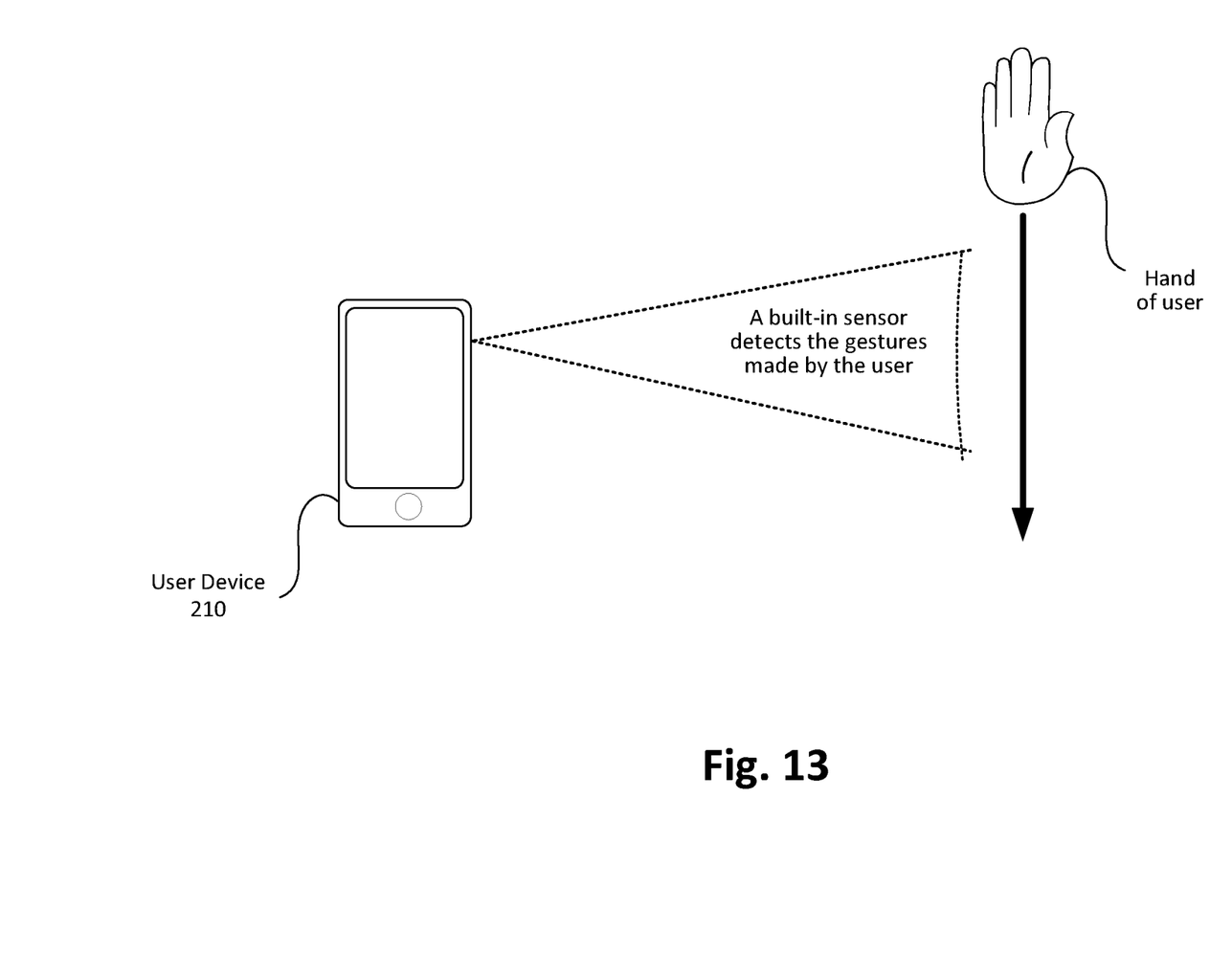
FIG. 13 provides an example of physical gesture that may be used to authenticate a user.

Referring now to FIG. 12, user device 210 may prompt the user to orient user device 210 in a particular way and to make a gesture corresponding to an authentication patterns. For instance, as shown in FIG. 12, user device 210 may prompt the user to point user device 210 north. In some implementations, an aid may be provided to the user to help the user complete the instructions. For instance, as shown in FIG. 12, the user may access a compass of user device 210 by pressing the Compass button provided along with the instructions. Additionally, user device 210 may provide instructions for making a physical gesture that can be detected by sensors of user device 210. For instance, user device 210 may instruct the user to make a downward gesture in front of the screen of user device 210. FIG. 13 provides a simple example of such the gesture described by the prompt of FIG. 12. As the hand of the user makes the downward motion instructed by user device 210, a built-in camera or infrared sensor of user device 210 may collect movement information representing the gesture made by the user. The movement information may be processes, and combined with user credentials requested in FIG. 11, in order to produce a data set upon which the user may be authenticated by authentication server 220.

Figure 14:
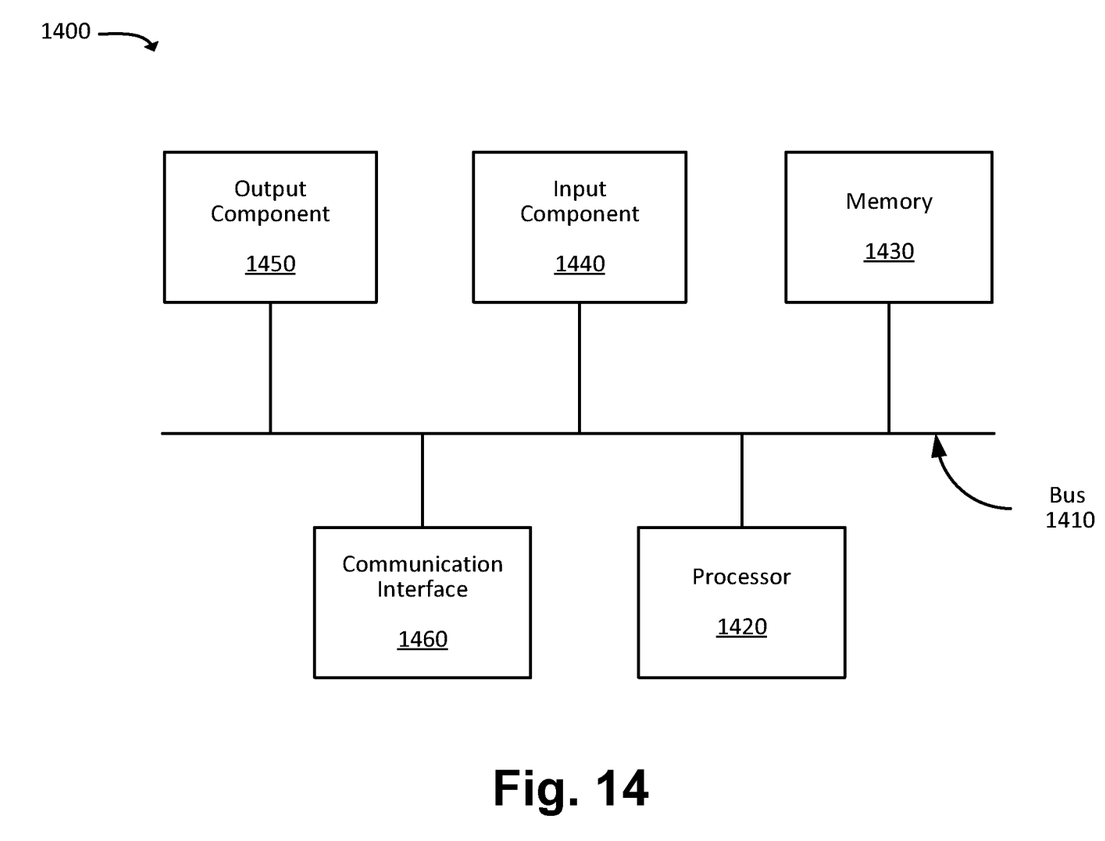
FIG. 14 is a diagram of example components of a device.

FIG. 14 is a diagram of example components of a device 1400. Each of the devices illustrated in FIGS. 1A-2 and 5-13 may include one or more devices 1400. Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, or processing logic that may interpret and execute instructions. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400, such as a keyboard, a keypad, a button, a switch, etc. Output component 1450 may include a mechanism that outputs information to the operator, such as a display, a speaker, one or more light emitting diodes (LEDs), etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of lines, arrows, and/or blocks have been described with regard to FIGS. 3 and 4 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method performed by a user device, comprising:
receiving, by the user device, a request from a user to access a service;
providing, by the user device, the user with a prompt that includes a puzzle, to be solved by the user, that includes incomplete instructions about how to physically move in accordance with an authentication pattern associated with gaining access to the service;
sensing, by the user device, physical movements, corresponding to the authentication pattern, of the user;
collecting, by the user device, movement information representing the physical movements of the user;
processing, by the user device, the movement information into a data set describing a pattern created by the physical movements of the user, the data set including:
directional movement information,
angular movement information,
speed information, and
duration information;
providing, by the user device, the data set to an authentication server; and
receiving, by the user device, a notification that the user has been authenticated for the service based on the data set.

2. The method of claim 1, further comprising:
prompting the user for user credentials;
receiving the user credentials from the user; and
providing the user credentials to an authentication service along with the data set.

3. The method of claim 1, wherein the prompt includes instructions for the user to physically move the user device in accordance with the authentication pattern.

4. The method of claim 3, wherein the sensing of the physical movements of the user is achieved by at least one of:
an accelerometer of the user device;
a gyroscope of the user device; or
a compass of the user device.

5. The method of claim 1, wherein the prompt includes instructions for the user to create a gesture, in accordance with the authentication pattern, near a sensor device of the user device.

6. The method of claim 5, wherein the sensing of the physical movements of the user is achieved by at least one of:
   a camera of the user device; or
   an infrared sensor of the user device.

7. The method of claim 1, wherein providing the prompt, collecting the movement information, and providing the data set is part of a Completely Automated Public Turing test to tell Computers and Humans Apart (CAPTCHA) test.

8. A user device, comprising:
   a non-transitory memory device storing a plurality of processor-executable instructions; and
      a processor configured to execute the processor-executable instructions, wherein executing the processor-executable instructions causes the processor to:
         receive a request from a user to access a service;
         provide the user with a prompt that includes a puzzle, to be solved by the user, that includes incomplete instructions about how to physically move in accordance with an authentication pattern associated with gaining access to the service;
         sense physical movements, corresponding to the authentication pattern, of the user;
         collect movement information representing the physical movements of the user;
         process the movement information into a data set describing a pattern created by the physical movements of the user, the data set including:
            directional movement information,
            angular movement information,
            speed information, and
            duration information;
         provide the data set to an authentication server; and
         receive a notification that the user has been authenticated for the service based on the data set.

9. The user device of claim 8, wherein executing the processor-executable instructions causes the processor to:
   prompt the user for user credentials;
   receive the user credentials from the user; and
   provide the user credentials to an authentication service along with the data set.

10. The user device of claim 8, wherein the prompt includes instructions for the user to physically move the user device in accordance with the authentication pattern.

11. The user device of claim 10, wherein, to sense the physical movements of the user, the user device includes at least one of:
   an accelerometer;
   a gyroscope; or
   a compass.

12. The user device of claim 8, wherein the prompt includes instructions for the user to create a gesture, in accordance with the authentication pattern, near a sensor device of the user device.

13. The user device of claim 12, wherein the sensing of the physical movements of the user is achieved by at least one of:
   a camera; or
   an infrared sensor.

14. The user device of claim 8, wherein providing the prompt, collecting the movement information, and providing the movement information is part of a Completely Automated Public Turing test to tell Computers and Humans Apart (CAPTCHA) test.

15. A server device, comprising:
   a non-transitory memory device storing a plurality of processor-executable instructions; and
   a processor configured to execute the processor-executable instructions, wherein executing the processor-executable instructions causes the processor to:
      provide, to a user device, a puzzle, to be solved by a user of the user device, wherein the puzzle includes incomplete instructions about how to physically move in accordance with an authentication pattern associated with accessing a service via the user device;
      receive, from the user device, a data set describing a pattern created by physical movements of a user, the data set including:
         directional movement information,
         angular movement information,
         speed information, and
         duration information;
      identify an authentication pattern associated with the user device;
      authenticate the user by comparing the data set to the authentication pattern to verify that the physical movements of the user adequately replicated the authentication pattern; and
      communicate, to the user device, a notification that the user has been authenticated.

16. The server device of claim 15, wherein the pattern created by the physical movements of a user more particularly corresponds to the physical movements of the user holding the user device.

17. The server device of claim 15, wherein the pattern created by the physical movements of a user more particularly corresponds a gesture, created by the user, near a sensor device of the user device.

18. The method of claim 1, wherein the movement information is collected by a camera of the user device and includes physical movements by the user in front of the camera.

19. The user device of claim 8, wherein the movement information is collected by a camera of the user device and includes physical movements by the user in front of the camera.

20. The server device of claim 15, wherein the data set includes movement information, collected by a camera of the user device about the physical movements by the user in front of the camera.

* * * * *